United States Patent
Xue et al.

(10) Patent No.: US 9,350,604 B1
(45) Date of Patent: May 24, 2016

(54) PACKET GATEWAY ASSIGNMENT BASED ON NETWORK CONNECTIVITY

(71) Applicant: Sprint Spectrum L.P., Overland Park, KS (US)

(72) Inventors: Wen Xue, Overland Park, KS (US);
Talat Jamshidi, Leawood, KS (US);
Rajat Kumar, Kansas City, MO (US);
Jay D. Cole, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 151 days.

(21) Appl. No.: 14/229,432

(22) Filed: Mar. 28, 2014

(51) Int. Cl.
*H04L 12/24* (2006.01)

(52) U.S. Cl.
CPC ................................ *H04L 41/0668* (2013.01)

(58) Field of Classification Search
CPC . H04L 65/102; H04L 41/0668; H04W 12/06; H04W 76/02; H04W 88/16; H04W 36/14
See application file for complete search history.

(56) References Cited

U.S. PATENT DOCUMENTS

| | | | |
|---|---|---|---|
| 6,956,846 B2 | 10/2005 | Lewis et al. | |
| 7,080,151 B1 | 7/2006 | Borella et al. | |
| 7,193,985 B1 | 3/2007 | Lewis et al. | |
| 7,305,429 B2 | 12/2007 | Borella | |
| 8,341,295 B1 | 12/2012 | Liu et al. | |
| 8,411,858 B2 | 4/2013 | Muhanna et al. | |
| 8,437,305 B2 | 5/2013 | Cheever et al. | |
| 2006/0002356 A1* | 1/2006 | Barany | H04W 8/06 370/338 |
| 2012/0084449 A1* | 4/2012 | Delos Reyes | H04L 61/1511 709/229 |
| 2013/0100815 A1* | 4/2013 | Kakadia | H04L 45/124 370/237 |

OTHER PUBLICATIONS

"(LTE) Attach and Default Bearer Setup," www.eventhelix.com/lte/attach/lte-attach.pdf, Dec. 11, 2012, 6 pages.

* cited by examiner

*Primary Examiner* — Christopher Grey

(57) ABSTRACT

A first service request, on behalf of a wireless communication device (WCD) may be received. The first WCD may be served by a first base station of a first wireless network provider, and may be subscribed to a second wireless network provider. A home packet gateway (PGW) device, with which to establish an inter-provider bearer path for the first WCD, may be identified. The inter-provider bearer path may include the first base station, a first serving gateway (SGW) device, and the home PGW device. The home PGW device may be operated by the second wireless network provider. In response to determining that the home PGW device is unresponsive, a backup PGW device may be identified. The backup PGW device may be operated by the first wireless network provider. The first SGW device may be instructed to establish intra-provider bearer paths that include the backup PGW device.

20 Claims, 8 Drawing Sheets

PACKET GATEWAY ASSIGNMENT BASED ON NETWORK CONNECTIVITY

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate via one or more of the RAN's base stations, serving gateways (SGWs), and packet gateways (PGWs). When a WCD roams, it may obtain the wireless services of a roaming wireless service provider that partners with the WCD's home wireless service provider. In this case, the WCD may be served by a base station and a SGW in the roaming wireless service provider's network, and a PGW in the home wireless service provider's network.

OVERVIEW

Wireless service providers generally operate within a particular geographical region. For instance, some such providers cover part or all of a country or group of countries. When a WCD subscribed to a wireless service provider roams outside of that provider's wireless coverage, the WCD may use the network of another wireless service provider in order to obtain wireless service.

Nonetheless, even when roaming, bearer traffic involving the WCD may be directed through the WCD's home wireless service provider. In this way, the home wireless service provider can, for instance, generate its own billing records and provide custom services for the WCD. Thus, the WCD may be assigned a PGW of its home wireless service provider even when assigned a base station and SGW of a roaming partner. The WCD's bearer traffic may flow through both the home PGW and the roaming SGW.

In some cases, for instance, when the WCD is roaming to a country or continent for which its home wireless service provider does not provide service, the WCD's bearer traffic may be backhauled between the roaming wireless service provider and the home wireless service provider. The backhaul path may include one or more international or intercontinental links. In some cases, bearer traffic and signaling traffic related to the WCD may take different physical links, or paths, between the two wireless service providers.

In some situations, a link carrying a WCD's bearer traffic may be disabled or may become impaired, while the link carrying the signaling traffic related to the WCD may be operational. Thus, in this case, signaling traffic between the roaming and home wireless service providers may attempt to establish an inter-provider bearer path between the roaming SGW and the home PGW, but some or all of the traffic on this bearer path may not be able to reach its destination.

In order to continue to provide communication services to roaming WCDs even when a link used for bearer traffic is down, a roaming wireless service provider may inform a home wireless service provider when the roaming wireless service provider does not receive traffic that is expected from the home PGW. In turn, the home wireless service provider may mark the home PGW as non-responsive (or "down") for the roaming wireless service provider. Then, until the home PGW is once again responsive for the roaming wireless service provider, the home wireless service provider might inform the roaming wireless service provider to use a different PGW for the WCD's bearer traffic. In this way, WCDs subscribed to the home wireless service provider and using the roaming wireless service provider's network may still be able to exchange bearer traffic with correspondent nodes.

At some later point, the roaming wireless service provider may determine that the home PGW is once again responsive. The roaming wireless service provider may inform the home service provider of this determination, and the home wireless service provider may mark the home PGW as responsive (or "up") for the roaming wireless service provider. The home PGW may once again be used in the bearer paths of WCDs that are subscribed to the home wireless service provider and use the roaming wireless service provider's network.

Accordingly, in a first example embodiment, a first service request may be received on behalf of a first WCD. The first WCD may be served by a first base station of a first wireless network provider, and may be subscribed to a second wireless network provider. A home PGW device, with which to establish an inter-provider bearer path for the first WCD, may be identified. The inter-provider bearer path may include the first base station, a first SGW device, and the home PGW device. The home PGW device may be operated by the second wireless network provider. In response to determining that the home PGW device is unresponsive, a backup PGW device may be identified. The backup PGW device may be operated by the first wireless network provider. The first SGW device may be instructed to establish intra-provider bearer paths that include the backup PGW device.

In a second example embodiment, an authentication request associated with a WCD may be received, for example, by a home subscriber server (HSS). The WCD may be served by a RAN of a first wireless service provider and subscribed to a second wireless service provider. The HSS may be operated by the second wireless service provider. An authentication response may be transmitted. The authentication response may indicate that the first wireless service provider is to facilitate establishment of an inter-provider bearer path between the WCD and a home PGW device. The home PGW device may be operated by the second wireless service provider. An indication may be received from the first wireless service provider. The indication may indicate that the first wireless service provider has been unable to communicate with the home PGW device. Possibly in response to receiving the indication that the first wireless service provider has been unable to communicate with the home PGW device, in subsequent authentication responses it may be indicated that the first wireless service provider is to facilitate establishment of intra-provider bearer paths between WCDs and a backup PGW device. The backup PGW device may be operated by the first wireless service provider, and the WCDs may be subscribed to the second wireless service provider.

A third example embodiment may include a non-transitory, computer-readable storage medium, having stored thereon program instructions that, upon execution by a computing device, cause the computing device to perform operations in accordance with the first and/or second example embodiment.

A fourth example embodiment may include a computing device containing at least a processor and data storage. The data storage may include program instructions that, when executed by the processor, cause the computing device to perform operations in accordance with the first and/or second example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. EXAMPLE WIRELESS COMMUNICATION SYSTEM

Figure 1:
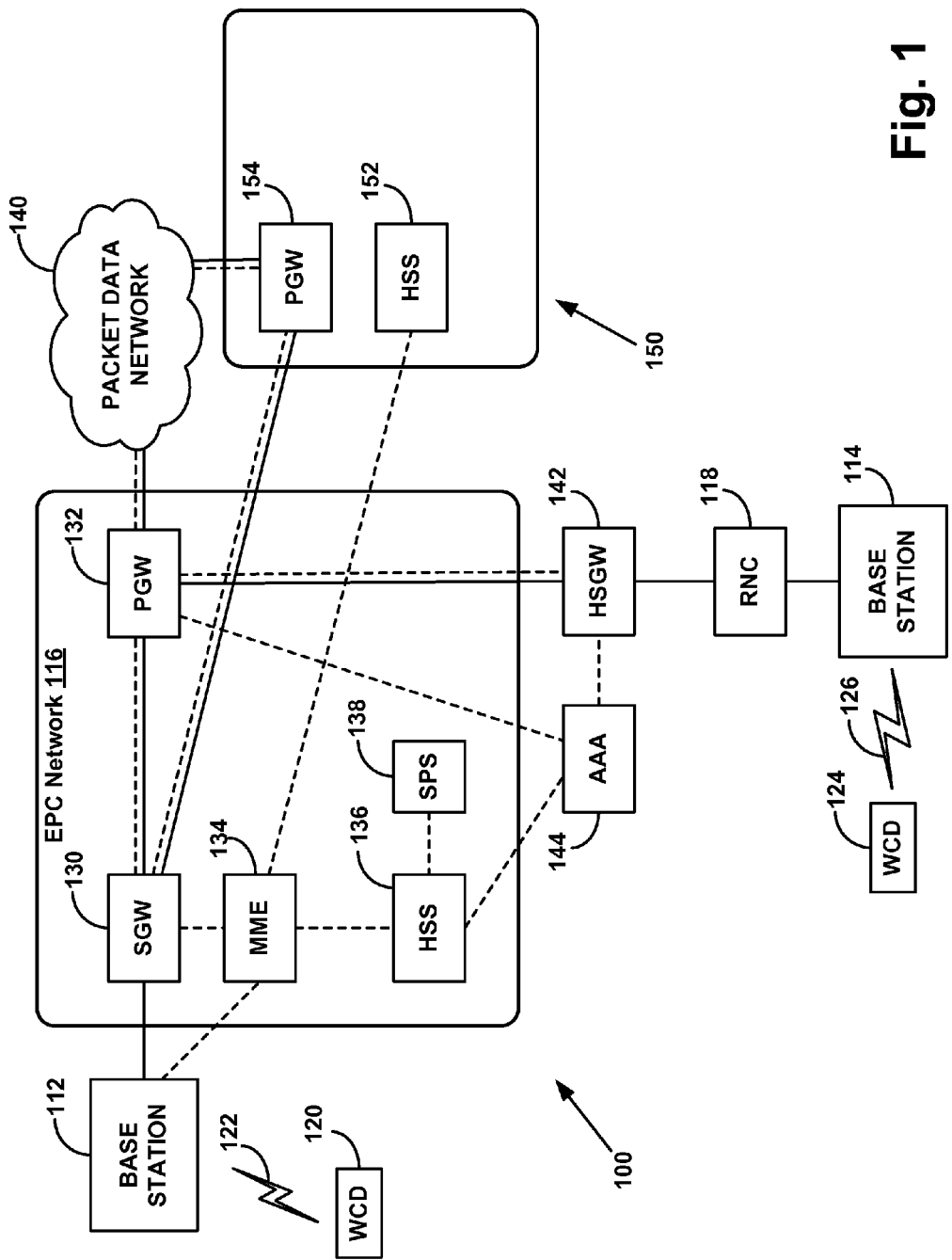
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved radio access network (RAN) that uses an Evolved Packet Core (EPC) network 116. Base station 114 is part of a legacy RAN that includes a radio network controller (RNC) 118. Base stations 112 and 114 each provide one or more respective wireless coverage areas through which the respective base station can communicate with one or more WCDs. The wireless coverage areas provided by base stations 112 and 114 could be either overlapping or non-overlapping.

The WCDs could be wireless telephones, wirelessly-equipped handheld, tablet, or laptop computers, or any other type of WCD. Some WCDs may be referred to as user equipment (UE). Despite this nomenclature, a WCD need not be an end-user device, and may include various types of devices that have limited interactions with human users, such as server devices, remote telemetry devices, and/or autonomous devices.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132, and/or between base station 112 and PGW 154. MME 134 may manage signaling traffic between base station 112 and various elements in EPC network 116, as well as signaling traffic between base station 112 and HSS 152. This signaling traffic, for example, may be related to authentication of WCDs and activating and de-activating bearer connections for WCDs. HSS 136 may be configured to authenticate WCDs, as well as access subscriber profiles stored in SPS 138. For example, SPS 138 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

For instance, a WCD subscribed to EPC network 116 may be assigned PGW 132 for bearer traffic communication with packet data network 140. Thus, the bearer path for this WCD may include base station 112, SGW 130, and PGW 132. On the other hand, a WCD subscribed to network 150 may be assigned PGW 154 for bearer traffic communication. Therefore, the bearer path for this WCD may include base station 112, SGW 130, and PGW 154. In some cases, in order to set up the bearer path to PGW 154, HSS 152 may be used to authenticate the WCD and/or to assign PGW 154 to serve the WCD.

In some embodiments, network 150, HSS 152, and PGW 154 may be operated by a home wireless service provider, and the other components in FIG. 1 may be operated by a roaming wireless service provider. The home and roaming wireless service providers may partner so that the roaming wireless service provider serves WCDs subscribed to the home wireless service provider when those WCDs cannot obtain wireless coverage from the home wireless service provider. The signaling and/or data traffic exchanged between the home and roaming wireless service providers may traverse packet data network 140 and/or one or more other networks or private peering gateways.

In addition, EPC network 116 may provide packet data connections for WCDs served by other RANs, such as WCDs served by legacy RANs. Despite being served by these RANs, the WCDs may be subscribed to the roaming wireless service provider or either the home wireless service provider.

In the example shown in FIG. 1, wireless communication system 100 includes an HRPD serving gateway (HSGW) 142 that supports interworking with a legacy RAN, exemplified in FIG. 1 by base station 114 and RNC 118, and EPC network 116. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132. Alternatively, WCD 124 may instead communicate via air interface 126, base station 114, RNC 118, HSGW 142, and PGW 152.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention.

The arrangement of wireless communication system 100 and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. EXAMPLE COMPUTING DEVICE

Figure 2:
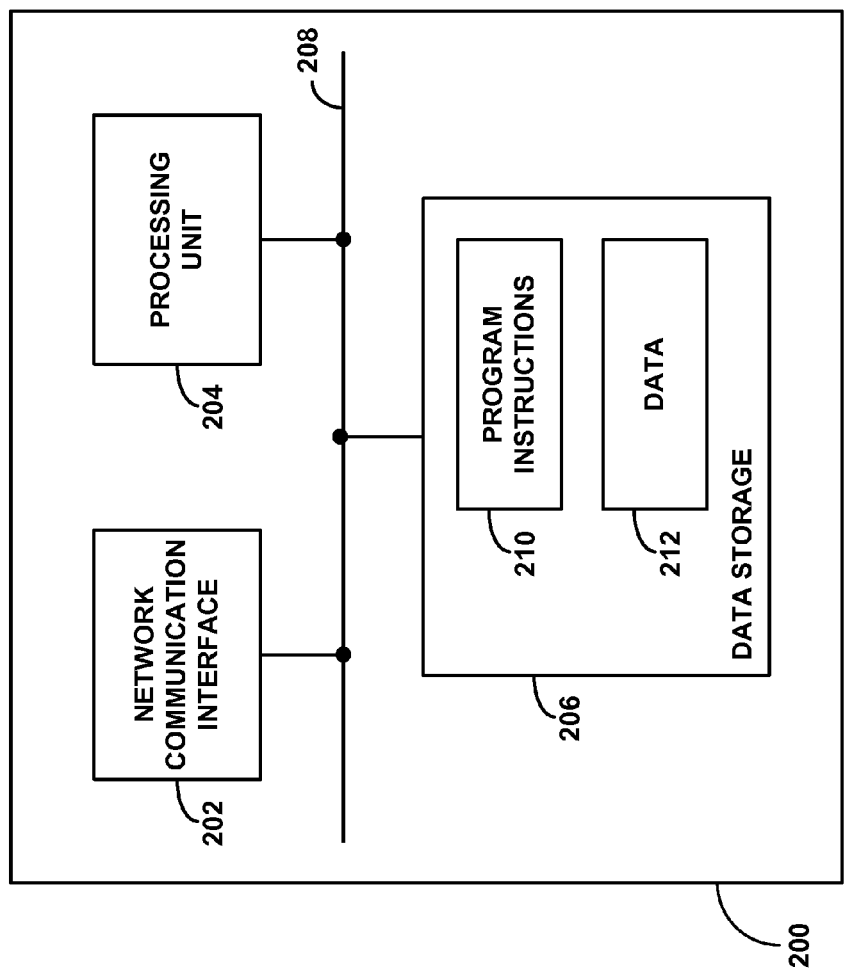
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could be a WCD or a part of the RAN. Thus, computing device 200 may represent a base station, MME, SGW, PGW, HSS, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. EXAMPLE MESSAGE FLOWS

For purposes of illustration, this section describes examples of transactions in accordance with possible embodiments. Each of FIGS. 3, 4A, 4B, and 5 may involve, directly or indirectly, WCD 300, base station 302, MME 304, SGW 306, PGW 308, HSS 310, and PGW 312. In some embodiments, base station 302, MME 304, SGW 306, and PGW 308 are operated by a roaming wireless service provider, HSS 310 and PGW 312 are operated by a home service provider, and WCD 300 is subscribed to the home service provider. As noted previously, the roaming wireless service provider equipment and the home wireless service provider equipment may be in different countries, regions, or continents. However, other embodiments may be possible.

Additionally, throughout FIGS. 3, 4A, 4B, and 5, various messages may be referred to with various labels, such as "connection request," "attach request," "authentication request," and so on. In some implementations, messages that perform the substantive functions described herein may be given different labels, or may be referred to differently. Further, the functions of some messages shown in these figures may be performed by more or fewer messages. Moreover, for purposes of simplicity, these figures may omit some messages that may be present in particular embodiments.

Figure 3:
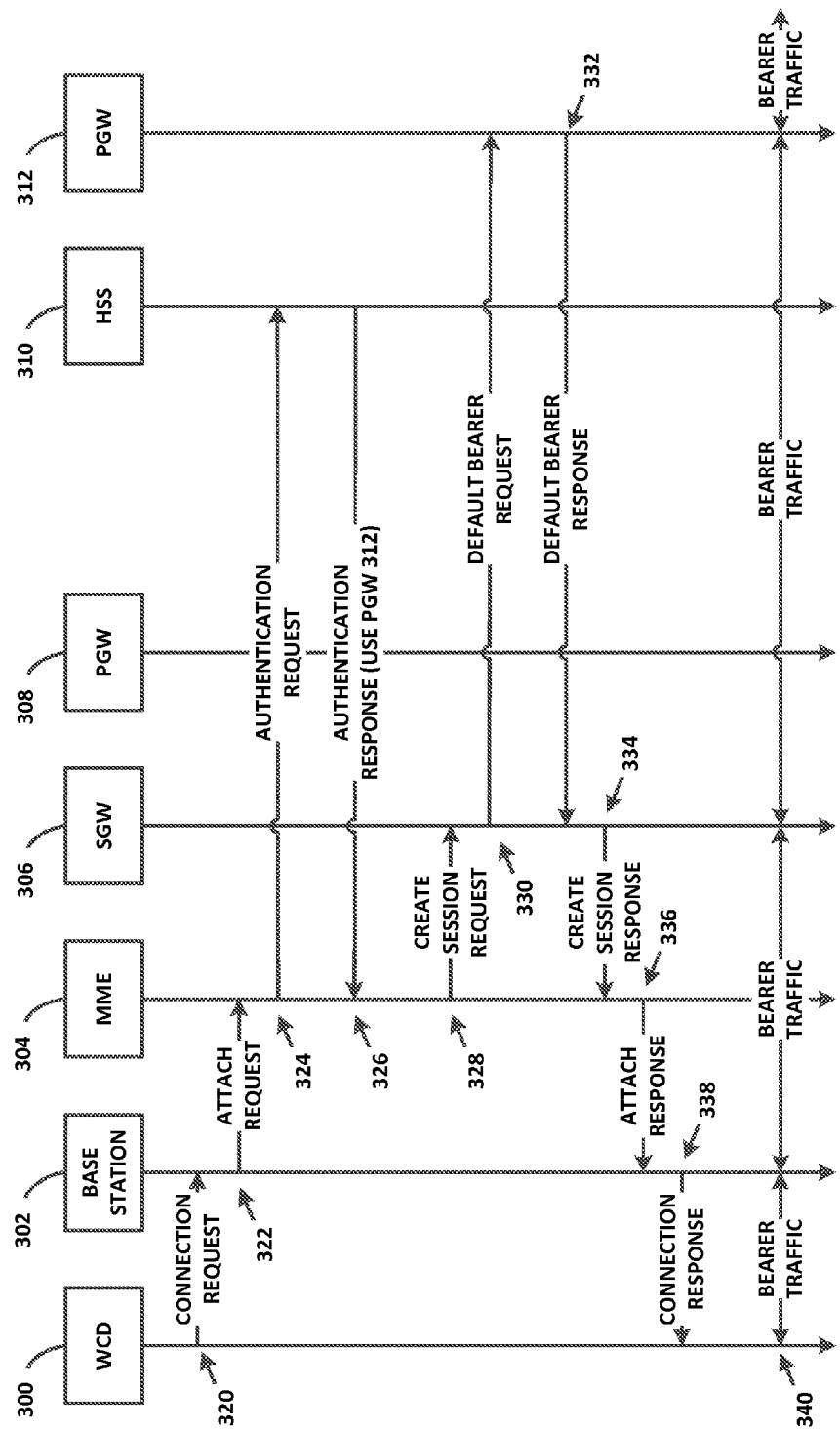
FIG. 3 is a message flow diagram, in accordance with an example embodiment.

FIG. 3 illustrates one possible way in which WCD 300 can obtain wireless service from the roaming wireless service provider. At step 320, WCD 200 may transmit a connection request to base station 302. At step 322, base station 302, in turn, may transmit an attach request to MME 304.

MME 304 may determine that WCD 300 is subscribed to the home service provider. In doing so, MME 304 may examine an identifier of WCD 300, such as a network access identifier (NAI), international mobile subscriber identifier (IMSI), mobile equipment identifier (MEID), or some other type of device or user identifier. Based on this identifier, MME 304 may determine that WCD 300 subscribes to the home wireless service provider, and that MME 304 should request authentication of WCD 300 from HSS 310.

At step 324, MME 304 may transmit an authentication request to HSS 310. This authentication request may seek to determine whether WCD 300 has a valid subscription with the home wireless service provider, and/or whether the home wireless service provider will permit WCD 300 to use the services of the roaming wireless service provider. HSS 310 may look up the NAI, IMSI, MEID, or other identifier of WCD 300 in a local or remote subscriber database to make this determination. At step 326, if WCD 300 has a valid subscription and is permitted to use the services of the roaming wireless service provider, HSS 310 may transmit an authentication response to MME 304. The authentication response may indicate that the roaming wireless service provider should use PGW 312 (a PGW of the home wireless service provider) in the bearer path for WCD 300.

At step 328, MME may transmit a create session request to SGW 306. Possibly among other functions, the create session request may instruct SGW 306 to create a portion of a bearer path from itself to PGW 312. Accordingly, at step 330, SGW 306 may transmit a default bearer request to PGW 312, and PGW 312 may respond, at step 332, by transmitting a default bearer response to SGW 306. Additional portions of the bearer path may be established at steps 334, 336, and 338 by SGW 306 transmitting a create session response to MME 304, MME 304 transmitting an attach response to base station 302, and/or base station 302 transmitting a connection response to WCD 300, respectively.

At step 340, a bearer path has been established for WCD 300, possibly involving WCD 300, base station 302, SGW 306, and PGW 312. MME 304 and HSS 310 may be perform only signaling functions, and therefore may not be part of this path. Via the bearer path, WCD 300 may communicate with correspondent nodes on a public network (e.g., the Internet) or other devices and/or services within the home wireless service provider's network.

Traffic between WCD 300 and these correspondent nodes may traverse equipment in both the roaming wireless service provider and the home wireless service provider. Thus, the bearer path for WCD 300 may be referred to as an inter-provider bearer path.

As noted previously, in some situations, an SGW of a roaming wireless service provider may fail to properly communicate with the PGW of a home wireless service provider, despite the respective MME and HSS of these entities being able to communicate. For instance, a peering point or link between the roaming SGW and home HGW may fail or otherwise be impaired or out of service for some period of time. If the home wireless service provider requires that the bearer paths of its subscribed WCDs traverse the home PGW, possibly many WCDs subscribed to the home wireless service provider that are roaming to the roaming wireless service provider may be unable to exchange bearer traffic with correspondent nodes.

Figure 4A:
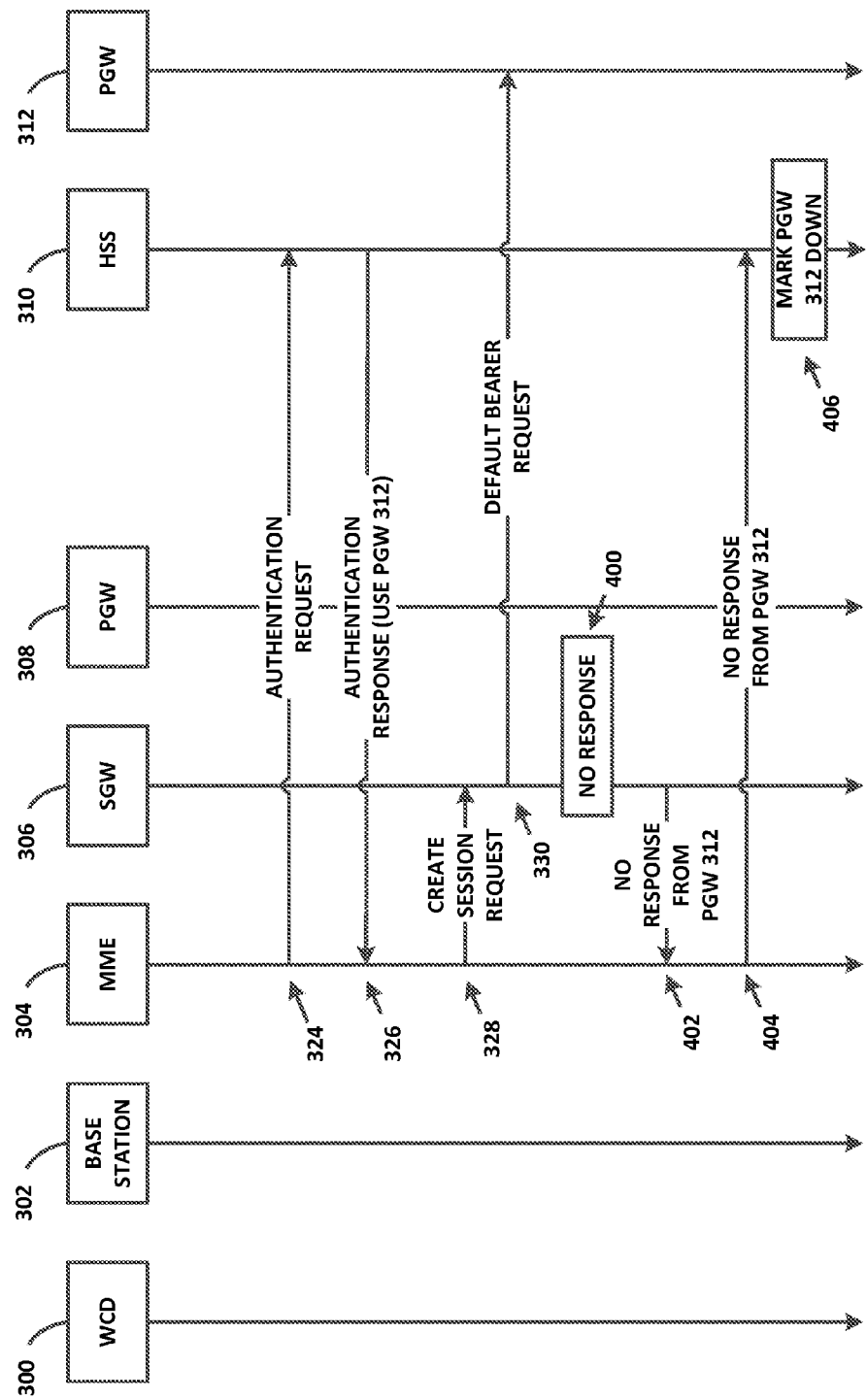
FIG. 4A is a message flow diagram, in accordance with an example embodiment.
Figure 4B:
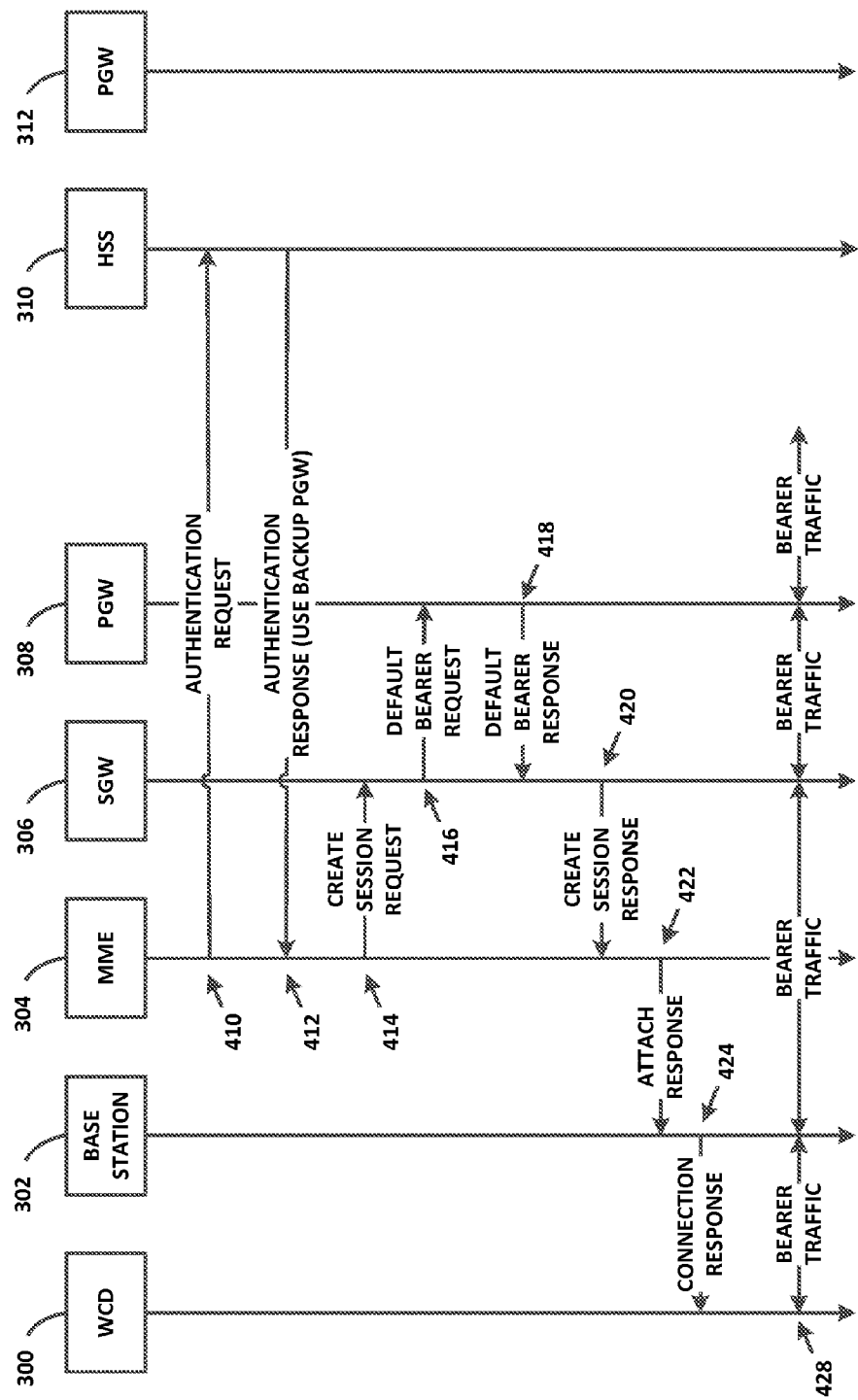
FIG. 4B is a message flow diagram, in accordance with an example embodiment.

In order to accommodate for outages between the roaming and home wireless service providers, and possibly to allow roaming WCDs to still be able to engage in some communication when a home PGW is impaired, unreachable, or non-responsive, the procedures illustrated by FIGS. 4A and 4B may be used. These procedures, however, may be used for other purposes as well.

FIG. 4A illustrates a possible embodiment that begins at step 324, which is analogous to that of step 324 in FIG. 3. Thus, at step 324, MME 304 may transmit an authentication request to HSS 310, on behalf of a WCD. This WCD may be subscribed to the home wireless service provider, and could be WCD 300.

At step 326, HSS 310 may transmit an authentication response to MME 304, indicating that the roaming wireless service provider should use PGW 312 in the bearer path for the WCD. At step 328, MME 304 may transmit a create session request to SGW 306, and at step 330, SGW 306 may transmit a default bearer request to PGW 312. However, SGW 306 might not receive a default bearer response from PGW 312.

SGW 306 may transmit zero or more additional default bearer requests to PGW 312. If SGW 306 fails to receive responses for these as well, then at step 400, SGW 306 may determine that it has not received a response from PGW 312. Accordingly, at step 402, SGW 306 may transmit a message to MME 304 indicating that SGW 306 has not been able to set establish a bearer path to PGW 312, or otherwise indicating that PGW 312 is non-responsive.

At step 404, MME 304 may transmit an indication, to HSS 310, that a component of the roaming wireless service provider has received no response from PGW 312 when attempting to establish a bearer path. Possibly in response to this indication, at step 406, HSS 310 may mark PGW 312 as down. Particularly, HSS 310 may include a list of PGWs used by the home wireless service provider. In this list, the status of each PGW for each respective roaming partner may be indicated. For instance, a PGW may be marked as "up" for a roaming wireless service provider, indicating that the PGW has been responding to communications from that roaming wireless service provider. Alternatively, a PGW may be marked as "down" for a roaming wireless service provider, indicating that the PGW has not been responding to communications from that roaming wireless service provider.

At this point, the call or data session that caused the authentication request of step 324 to be transmitted may fail. Alternatively, MME 304 may attempt to re-authenticate the WCD, possibly so that a backup PGW can be assigned to the WCD.

Thus, FIG. 4B may continue the example embodiment of FIG. 4A. At step 410, MME 304 may transmit another authentication request to HSS 310. This authentication request may be transmitted on behalf of WCD 300, which may be the same WCD for which authentication request 324 was transmitted. Alternatively, the authentication request of step 324 may have been transmitted on behalf of a WCD other than WCD 300.

At step 412, HSS 310 may transmit an authentication response to MME 304. The authentication response may indicate that the roaming wireless network service provider should use a backup PGW (e.g., instead of PGW 312 which is marked down), for establishment of a bearer path. Accordingly, at step 414, MME 304 may transmit a create session request to SGW 306. As part of the create session request, MME 304 may indicate that SGW 306 is to establish a bearer path with a backup PGW, such as PGW 308.

Thus, at step 416, SGW 306 may transmit a default bearer request to PGW 308, and at step 418, PGW 308 may transmit a default bearer response to SGW 306. These two steps may establish a bearer path between SGW 306 and PGW 308 for WCD 300.

Additional portions of the bearer path may be established at steps 420, 422, and 424, by SGW 306 transmitting a create session response to MME 304, MME 304 transmitting an attach response to base station 302, and/or base station 302 transmitting a connection response to WCD 300, respectively. At step 428, a bearer path has been established for WCD 300, possibly involving WCD 300, base station 302, SGW 306, and PGW 308. Via the bearer path, WCD may communicate with correspondent nodes on a public network (e.g., the Internet), but might not be able to communicate with at least some other devices and/or services within the home wireless service provider's network.

Traffic between WCD 300 and these correspondent nodes may traverse equipment in the roaming wireless service provider but possibly not the home wireless service provider. Thus, in this case, the bearer path for WCD 300 may be referred to as an intra-provider bearer path.

MME 304, or some other device or devices associated with the roaming wireless service provider, may periodically or aperiodically transmit probe messages to a PGW that has been unresponsive (e.g., PGW 312) to determine if and/or when the PGW once again is reachable from the roaming wireless service provider. These probe messages may be, for instance, Internet Control Message Protocol (IMCP) ping messages, or some other type of probe message. If the PGW responds to one or more of the probe messages, the roaming wireless service provider may inform the home wireless service provider as such so that the home wireless service provider can mark the PGW as up.

Figure 5:
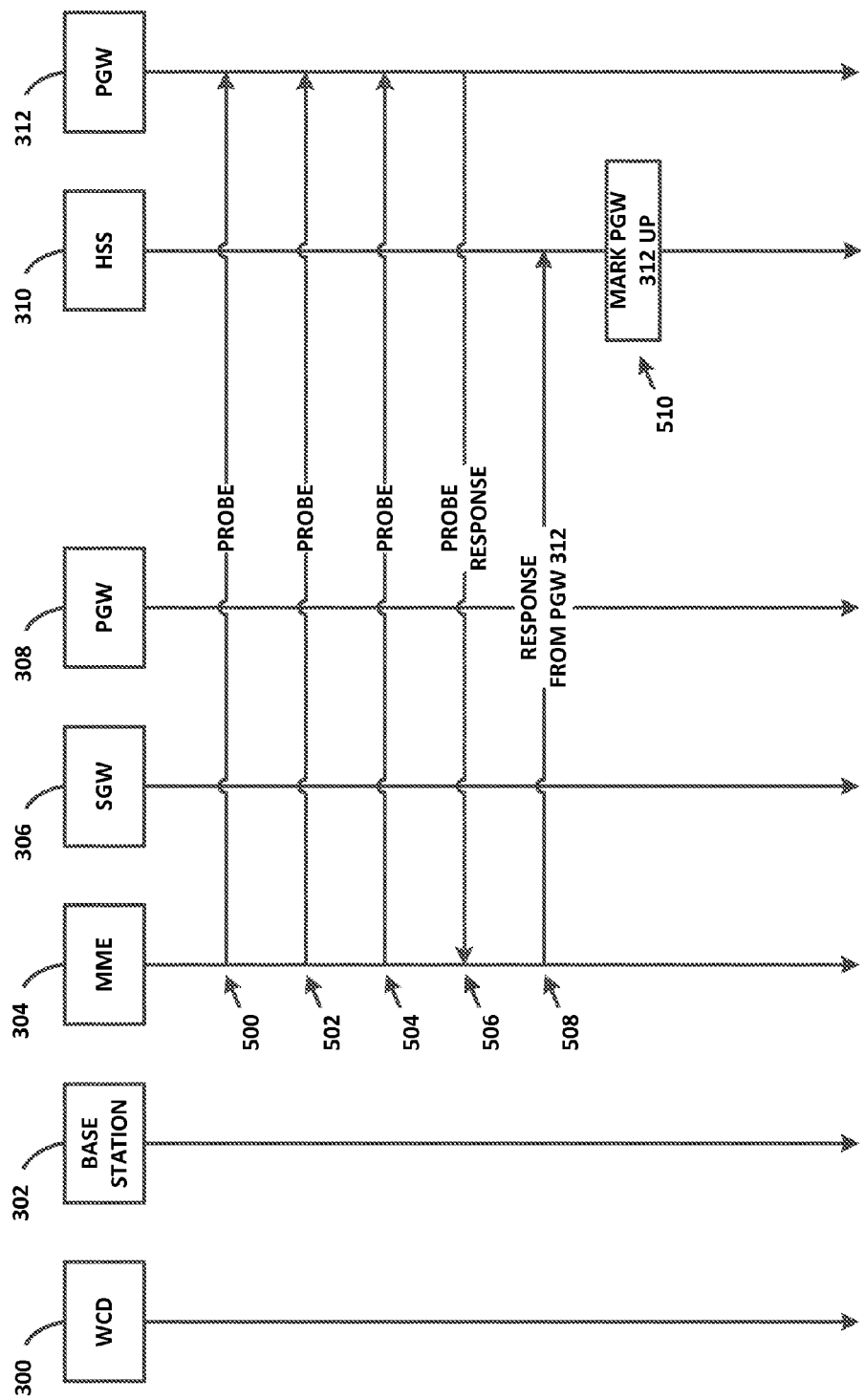
FIG. 5 is a message flow diagram, in accordance with an example embodiment.

FIG. 5 illustrates such a process. For instance, at steps 500, 502, and 504, MME 304 may transmit probe messages to PGW 312. At least one of these probe messages may be received by PGW 312. Thus, at step 506, PGW 312 may transmit a probe response message to MME 304. Possibly as a result of receiving the probe response message, at step 508, MME 304 may transmit an indication to HSS 310. The indication may indicate that the roaming wireless service provider has received a response from PGW 312. Consequently, at step 510, HSS 310 may mark PGW 312 as up for the roaming wireless service provider. In this way, HSS 310 may once again begin assigning PGW 312 as a PGW for bearer paths involving WCDs subscribed to the home wireless service provider and served by the roaming wireless service providers.

4. EXAMPLE OPERATIONS

Figure 6:
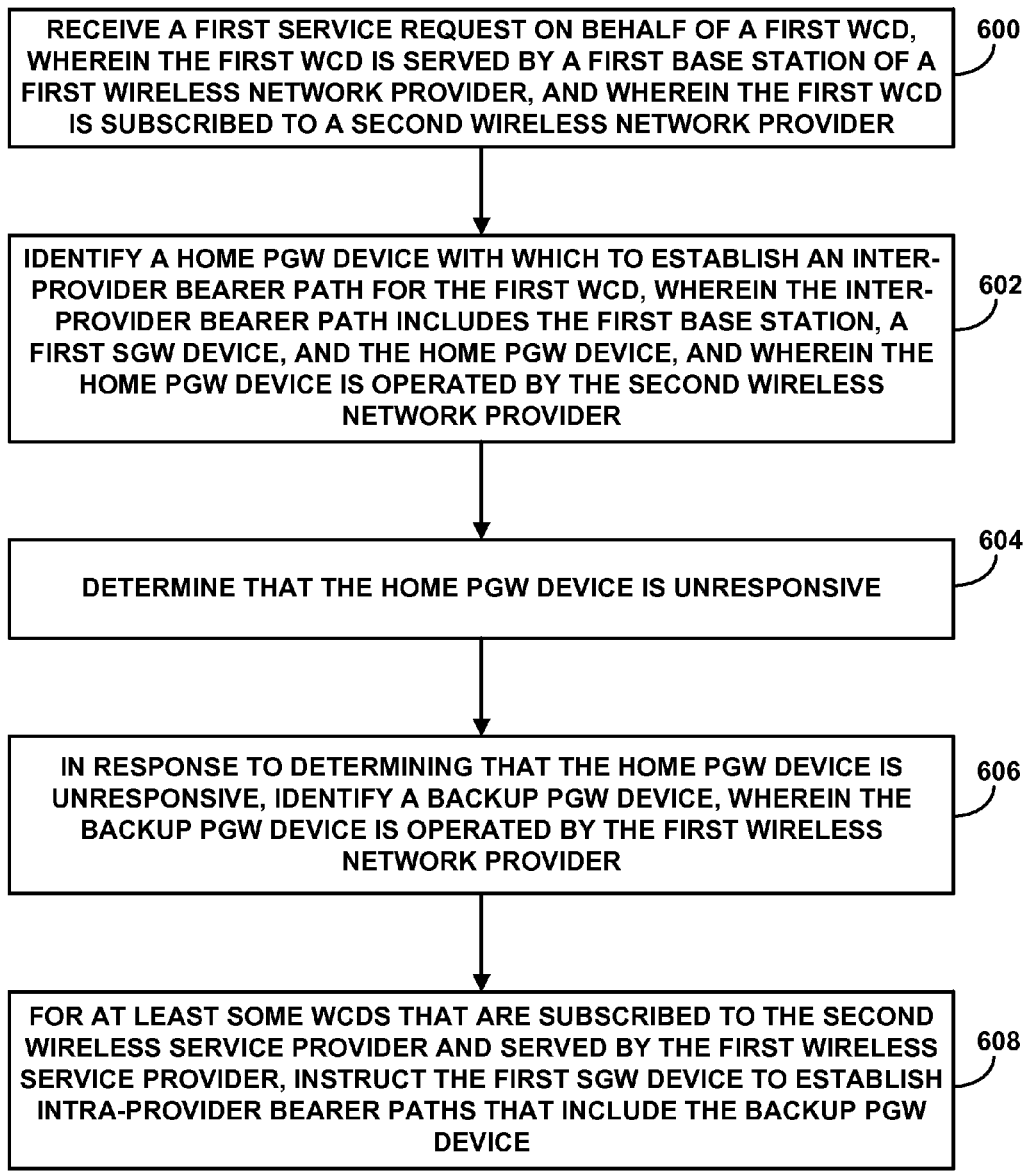
FIG. 6 is a flow chart, in accordance with an example embodiment.
Figure 7:
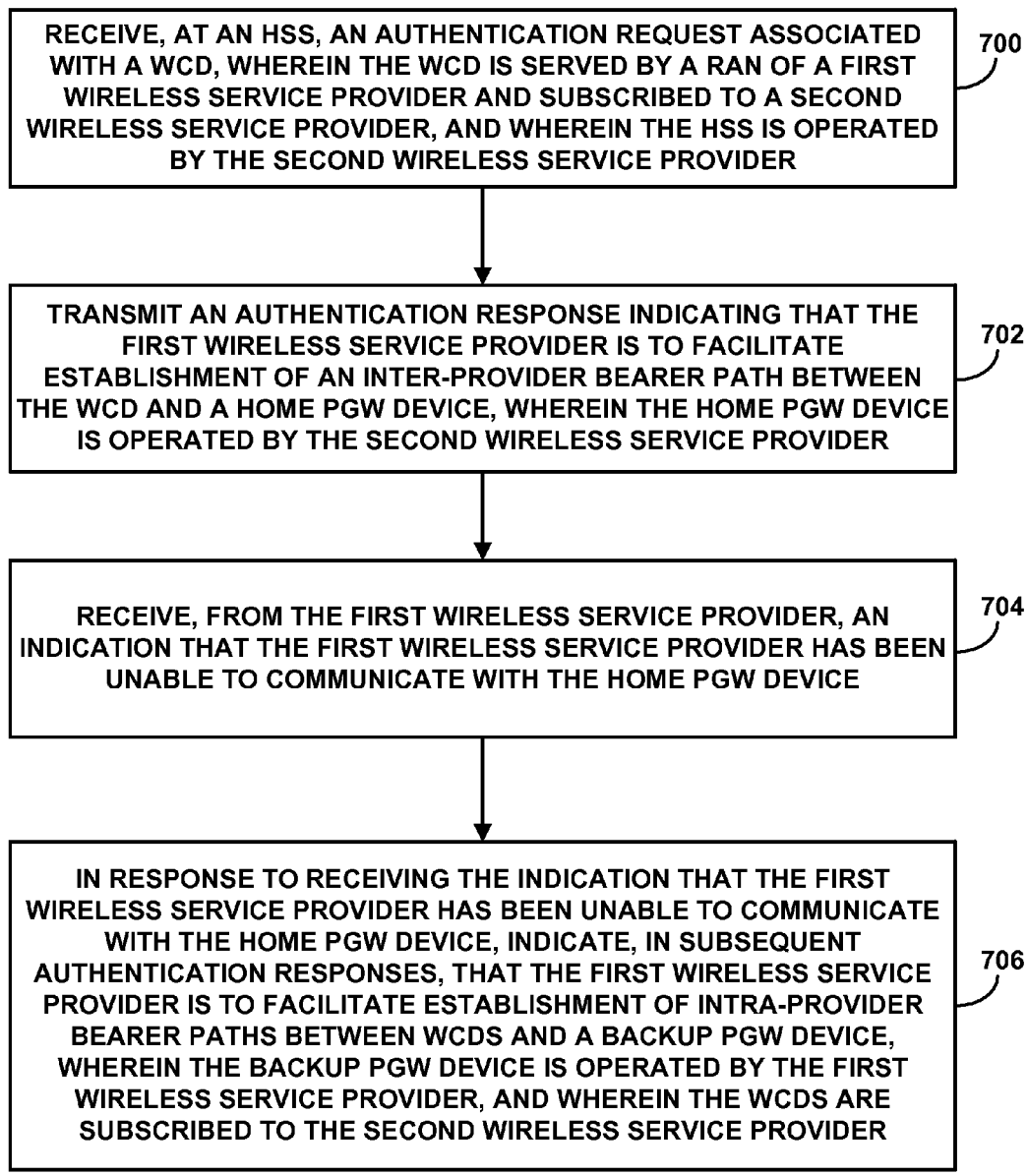
FIG. 7 is flow chart, in accordance with an example embodiment.

FIGS. 6 and 7 are flow charts in accordance with example embodiments. The operations illustrated by these flow charts may be carried out by a computing device, such as computing device 200. In some embodiments, computing device 200 may represent a RAN device, such as a base station, SGW, PGW, HSS, and/or MME.

At block 600 of FIG. 6, a first service request on behalf of a first WCD may be received. The first WCD may be served by a first base station of a first wireless network provider (e.g., a roaming wireless service provider). The first WCD may be subscribed to a second wireless network provider (e.g., a home wireless service provider).

At block 602, a home PGW device with which to establish an inter-provider bearer path for the first WCD may be identified. The inter-provider bearer path may include the first base station, a first SGW device, and the home PGW device. The home PGW device may be operated by the second wireless network provider.

At block 604, it may be determined that the home PGW device is unresponsive. At block 606, in response to determining that the home PGW device is unresponsive, a backup PGW device may be identified. The backup PGW device may be operated by the first wireless network provider.

At block 608, for at least some WCDs that are subscribed to the second wireless service provider and served by the first wireless service provider, the first SGW device may be instructed to establish intra-provider bearer paths that include the backup PGW device. Instructing the first SGW device to establish intra-provider bearer paths that include the backup PGW device may involve establishing an intra-provider bearer path for the first WCD. The intra-provider bearer path may include the first base station, the first SGW device, and the backup PGW device.

Determining that the home PGW device is unresponsive may involve determining that the first SGW device was unable to establish the inter-provider bearer path to the home PGW device. Determining that the first SGW device was unable to establish the inter-provider bearer path to the home PGW device may involve receiving a message from the first SGW device indicating that the SGW device received no response from the home PGW device. Accordingly, an indication may be transmitted to the HSS, where the indication indicates that no response was received from the home PGW device.

Further, identifying the backup PGW device may involve transmitting, to the HSS, a second authentication request. The second authentication request may request authentication of the first WCD or another WCD subscribed to the second wireless service provider. A second authentication response may be received from the HSS. The second authentication response may include an instruction to select a PGW device operated by the first wireless network provider. In response to receiving the instruction, the backup PGW device may be selected.

In some embodiments, it may be determined that the home PGW device is once again responsive. In response to determining that the home PGW device is responsive, a notification that the home PGW device is responsive may be transmitted to the HSS. Additionally, a second service request may be received on behalf of a second WCD. The second WCD may be served by a second base station of the first wireless network provider, and the second WCD may be subscribed to the second wireless network provider. Based on the home PGW device being responsive, a second inter-provider bearer path may be established for the second WCD. The second inter-provider bearer path may include the second base station, the first SGW device, and the home PGW device. Determining that the home PGW device is responsive may involve the MME device transmitting a message to the home PGW device and receiving an associated response from the home PGW device.

Alternatively, if the home PGW device remains non-responsive, a second service request on behalf of a second WCD may be received. The second WCD may be served by a second base station of the first wireless network provider, and subscribed to the second wireless network provider. Based on the home PGW device being unresponsive, an intra-provider bearer path may be established for the second WCD. The intra-provider bearer path may include the second base station, a second SGW device, and the backup PGW device.

At block 700 of FIG. 7, an HSS may receive an authentication request associated with a WCD. The WCD may be served by a RAN of a first wireless service provider (e.g., a roaming wireless service provider) and may be subscribed to a second wireless service provider (e.g., a home wireless service provider). The HSS may be operated by the second wireless service provider.

At block 702, an authentication response may be transmitted. The authentication response may indicate that the first wireless service provider is to facilitate establishment of an inter-provider bearer path between the WCD and a home PGW device. The home PGW device may be operated by the second wireless service provider.

At block 704, an indication may be received from the first wireless service provider. The indication may indicate that the first wireless service provider has been unable to communicate with the home PGW device.

At block 706, possibly in response to receiving the indication that the first wireless service provider has been unable to communicate with the home PGW device, it may be indicated, in subsequent authentication responses, that the first wireless service provider is to facilitate establishment of intra-provider bearer paths between WCDs and a backup PGW device. The backup PGW device may be operated by the first wireless service provider, and the WCDs may be subscribed to the second wireless service provider.

It should be understood that the embodiments depicted in FIGS. 6 and 7 are merely examples, and that other embodiments may be possible. For instance, the features associated with any of FIGS. 3, 4A, 4B, and 5, may be combined with either or both of the embodiments of FIGS. 6 and 7.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    receiving a first service request on behalf of a first wireless communication device (WCD), wherein the first WCD is served by a first base station of a first wireless network provider, and wherein the first WCD is subscribed to a second wireless network provider;
    identifying, at a mobility management entity (MME) device, a home packet gateway (PGW) device with which to establish an inter-provider bearer path for the first WCD, wherein the inter-provider bearer path includes the first base station, a first serving gateway (SGW) device, and the home PGW device, and wherein the home PGW device is operated by the second wireless network provider;
    determining that the home PGW device is unresponsive;
    in response to determining that the home PGW device is unresponsive, identifying a backup PGW device, wherein the backup PGW device is operated by the first wireless network provider; and for at least some WCDs that are subscribed to the second wireless service provider and served by the first wireless service provider, instructing the first SGW device to establish intra-provider bearer paths that include the backup PGW device.

2. The method of claim 1, wherein instructing the first SGW device to establish intra-provider bearer paths that include the backup PGW device comprises establishing an intra-provider bearer path for the first WCD, wherein the intra-provider bearer path includes the first base station, the first SGW device, and the backup PGW device.

3. The method claim 1, wherein identifying the home PGW device with which to establish the inter-provider bearer path for the first WCD comprises:
transmitting, to a home subscription server (HSS), an authentication request requesting authentication of the first WCD, wherein the HSS is operated by the second wireless network provider; and
receiving, from the HSS, an authentication response, wherein the authentication response identifies the home PGW device.

4. The method of claim 3, wherein determining that the home PGW device is unresponsive comprises determining that the first SGW device was unable to establish the first bearer path to the home PGW device.

5. The method of claim 4, wherein determining that the first SGW device was unable to establish the inter-provider bearer path to the home PGW device involves receiving a message from the first SGW device indicating that the first SGW device received no response from the home PGW device, the method further comprising:
transmitting an indication to the HSS, wherein the indication indicates that no response was received from the home PGW device.

6. The method of claim 3, wherein identifying the backup PGW device comprises:
transmitting, to the HSS, a second authentication request, wherein the second authentication request requests authentication of a WCD subscribed to the second wireless service provider;
receiving, from the HSS, a second authentication response, wherein the second authentication response includes an instruction to select a PGW device operated by the first wireless network provider; and
in response to receiving the instruction, selecting the backup PGW device.

7. The method of claim 3, further comprising:
determining that the home PGW device is responsive; and
in response to determining that the home PGW device is responsive, transmitting a notification to the HSS that the home PGW device is responsive.

8. The method of claim 7, further comprising:
receiving a second service request on behalf of a second WCD, wherein the second WCD is served by a second base station of the first wireless network provider, and wherein the second WCD is subscribed to the second wireless network provider; and
based on the home PGW device being responsive, establishing a second inter-provider bearer path for the second WCD, wherein the second inter-provider bearer path includes the second base station, the first SGW device, and the home PGW device.

9. The method of claim 7, wherein determining that the home PGW device is responsive comprises the MME device transmitting a message to the home PGW device and receiving an associated response from the home PGW device.

10. The method of claim 1, further comprising:
receiving a second service request on behalf of a second WCD, wherein the second WCD is served by a second base station of the first wireless network provider, and wherein the second WCD is subscribed to the second wireless network provider; and
based on the home PGW device being unresponsive, establishing a second intra-provider bearer path for the second WCD, wherein the second intra-provider bearer path includes the second base station, a second SGW device, and the backup PGW device.

11. A method comprising:
receiving, at a home subscription server (HSS), an authentication request associated with a wireless communication device (WCD), wherein the WCD is served by a radio access network (RAN) of a first wireless service provider and subscribed to a second wireless service provider, and wherein the HSS is operated by the second wireless service provider;
transmitting an authentication response indicating that the first wireless service provider is to facilitate establishment of an inter-provider bearer path between the WCD and a home packet gateway (PGW) device, wherein the home PGW device is operated by the second wireless service provider;
receiving, from the first wireless service provider, an indication that the first wireless service provider has been unable to communicate with the home PGW device; and
in response to receiving the indication that the first wireless service provider has been unable to communicate with the home PGW device, indicating, in subsequent authentication responses, that the first wireless service provider is to facilitate establishment of intra-provider bearer paths between WCDs and a backup PGW device, wherein the backup PGW device is operated by the first wireless service provider, and wherein the WCDs are subscribed to the second wireless service provider.

12. An article of manufacture including a non-transitory computer-readable medium, having stored thereon program instructions that, upon execution by a computing device, cause the computing device to perform operations comprising:
receiving a first service request on behalf of a first wireless communication device (WCD), wherein the first WCD is served by a first base station of a first wireless network provider, and wherein the first WCD is subscribed to a second wireless network provider;
identifying a home packet gateway (PGW) device with which to establish an inter-provider bearer path for the first WCD, wherein the inter-provider bearer path includes the first base station, a first serving gateway (SGW) device, and the home PGW device, and wherein the home PGW device is operated by the second wireless network provider;
determining that the home PGW device is unresponsive;
in response to determining that the home PGW device is unresponsive, identifying a backup PGW device, wherein the backup PGW device is operated by the first wireless network provider; and
for at least some WCDs that are subscribed to the second wireless service provider and served by the first wireless service provider, instructing the first SGW device to establish intra-provider bearer paths that include the backup PGW device.

13. The article of manufacture of claim 12, wherein instructing the first SGW device to establish intra-provider bearer paths that include the backup PGW device comprises establishing an intra-provider bearer path for the first WCD, wherein the intra-provider bearer path includes the first base station, the first SGW device, and the backup PGW device.

14. The article of manufacture of claim 12, wherein identifying the home PGW device with which to establish the inter-provider bearer path for the first WCD comprises:
   transmitting, to a home subscription server (HSS), an authentication request requesting authentication of the first WCD, wherein the HSS is operated by the second wireless network provider; and
   receiving, from the HSS, an authentication response, wherein the authentication response indicates the home PGW device.

15. The article of manufacture of claim 14, wherein determining that the home PGW device is unresponsive comprises determining that the first SGW device was unable to establish the inter-provider bearer path to the home PGW device.

16. The article of manufacture of claim 15, wherein determining that the first SGW device was unable to establish the inter-provider bearer path to the home PGW device involves receiving a message from the first SGW device indicating that the first SGW device received no response from the home PGW device, the operations further comprising:
   transmitting an indication to the HSS, wherein the indication indicates that no response was received from the home PGW device.

17. The article of manufacture of claim 14, wherein identifying the backup PGW device comprises:
   transmitting, to the HSS, a second authentication request, wherein the second authentication request requests authentication of a WCD subscribed to the second wireless service provider;
   receiving, from the HSS, a second authentication response, wherein the second authentication response includes an instruction to select a PGW device operated by the first wireless network provider; and
   in response to receiving the instruction, selecting the backup PGW device.

18. The article of manufacture of claim 14, the operations further comprising:
   determining that the home PGW device is responsive; and
   in response to determining that the home PGW device is responsive, transmitting a notification to the HSS that the home PGW device is responsive.

19. The article of manufacture of claim 18, the operations further comprising:
   receiving a second service request on behalf of a second WCD, wherein the second WCD is served by a second base station of the first wireless network provider, and wherein the second WCD is subscribed to the second wireless network provider; and
   based on the home PGW device being responsive, establishing a second inter-provider bearer path for the second WCD, wherein the second inter-provider bearer path includes the second base station, the first SGW device, and the home PGW device.

20. The article of manufacture of claim 18, wherein determining that the home PGW device is responsive comprises the MME device transmitting a message to the home PGW device and receiving an associated response from the home PGW device.

* * * * *